US012681925B1

(12) United States Patent
S et al.

(10) Patent No.: US 12,681,925 B1
(45) Date of Patent: Jul. 14, 2026

(54) METHOD, APPARATUS, AND COMPUTER-READABLE MEDIUM FOR INTENT CLASSIFICATION OF NATURAL LANGUAGE QUERIES IN A GENERATIVE ARTIFICIAL INTELLIGENCE PLATFORM

(71) Applicant: INFORMATICA LLC, Redwood City, CA (US)

(72) Inventors: Sarath S, Ernakulam (IN); Ankan Dutta, Asansol (IN); Natesan Karthikeyan, Bangalore (IN); Vishal Balagangadhar, Bangalore (IN)

(73) Assignee: INFORMATICA LLC, Redwood City, CA (US)

( * ) Notice: Subject to any disclaimer, the term of this patent is extended or adjusted under 35 U.S.C. 154(b) by 0 days.

(21) Appl. No.: 19/092,580

(22) Filed: Mar. 27, 2025

Related U.S. Application Data

(63) Continuation-in-part of application No. 19/016,948, filed on Jan. 10, 2025.

(51) Int. Cl.
*G06F 16/00* (2019.01)
*G06F 16/242* (2019.01)
(Continued)

(52) U.S. Cl.
CPC ...... *G06F 16/243* (2019.01); *G06F 16/24575* (2019.01); *G06F 16/248* (2019.01)

(58) Field of Classification Search
CPC . G06F 16/243; G06F 16/24575; G06F 16/248
See application file for complete search history.

(56) References Cited

U.S. PATENT DOCUMENTS 11,245,646 B1 * 2/2022 Koukoumidis ........ G06Q 10/00
12,265,528 B1 * 4/2025 Lan ....................... G06F 16/243
(Continued)

FOREIGN PATENT DOCUMENTS

CN 115408443 A * 11/2022 ........... G06F 16/248

OTHER PUBLICATIONS

RASA Intent Classification using LLM retrived from https://rasa.com/docs/rasa/next/llms/llm-intent; 6 pages.
(Continued)

*Primary Examiner* — Noosha Arjomandi
(74) *Attorney, Agent, or Firm* — Reed Smith LLP; Amardeep S. Grewal

(57) ABSTRACT

A method, apparatus, and computer-readable medium for intent classification of natural language queries in a generative artificial intelligence platform, the method including receiving a natural language query from a user in a user interface of a generative artificial intelligence platform, querying an entity index based on query terms to identify entities corresponding to the natural language query, identifying assets in the enterprise data catalog corresponding to the entities, identifying a metadata context corresponding to the assets, retrieving previous conversations of the user, generating a structured prompt based on the natural language query, the assets, the metadata context corresponding to the assets, and the previous conversations, and determining an intent associated with the natural language query by inputting the structured prompt into a fine-tuned large language model, the fine-tuned large language model being trained based on training queries, training conversations, and training metadata contexts.

21 Claims, 13 Drawing Sheets

(51) Int. Cl.
*G06F 16/2457* (2019.01)
*G06F 16/248* (2019.01)

(56) References Cited

U.S. PATENT DOCUMENTS

| | | | | |
|---|---|---|---|---|
| 12,443,607 | B1 * | 10/2025 | Guo | G06F 16/248 |
| 12,511,256 | B2 * | 12/2025 | Layton | G06F 16/164 |
| 12,512,091 | B2 * | 12/2025 | Vu | G10L 15/063 |
| 2020/0050949 | A1 * | 2/2020 | Sundararaman | G06F 40/284 |
| 2020/0073984 | A1 * | 3/2020 | Sen | G06F 16/243 |
| 2020/0311349 | A1 * | 10/2020 | Balasubramanian | G06N 3/0442 |
| 2022/0188842 | A1 * | 6/2022 | Gustafson | G06F 16/3329 |
| 2024/0004891 | A1 * | 1/2024 | Basu | G06N 20/00 |
| 2024/0061835 | A1 * | 2/2024 | Subramanian | G06F 16/252 |
| 2024/0281472 | A1 * | 8/2024 | LaRhette | G06F 16/9558 |
| 2024/0362208 | A1 * | 10/2024 | Naufel | G06F 16/243 |
| 2024/0386015 | A1 * | 11/2024 | Crabtree | G06F 16/9024 |
| 2025/0045287 | A1 * | 2/2025 | Narayanaswamy | G06F 16/252 |
| 2025/0094465 | A1 * | 3/2025 | Xu | G06F 16/383 |
| 2025/0094733 | A1 * | 3/2025 | Xu | G06F 40/40 |
| 2025/0094821 | A1 * | 3/2025 | Hettige | G06N 3/0475 |
| 2025/0095808 | A1 * | 3/2025 | Davelaar | G06F 3/0482 |
| 2025/0110979 | A1 * | 4/2025 | Saligrama Shreeram | G06F 16/3344 |
| 2025/0111151 | A1 * | 4/2025 | Huang | G06F 40/284 |
| 2025/0139168 | A1 * | 5/2025 | Hsu | G06F 16/90332 |
| 2025/0156419 | A1 * | 5/2025 | Shah | G06F 16/254 |
| 2025/0156898 | A1 * | 5/2025 | Crabtree | G06Q 30/0277 |
| 2025/0245249 | A1 * | 7/2025 | Thunuguntla | G06F 40/284 |
| 2025/0284683 | A1 * | 9/2025 | Modelo-Howard | G06F 16/243 |
| 2025/0291838 | A1 * | 9/2025 | Arcilla | G06Q 10/06311 |
| 2025/0307236 | A1 * | 10/2025 | Tang | G06F 16/24534 |
| 2025/0315492 | A1 * | 10/2025 | Iyer | G06F 16/9538 |
| 2025/0321959 | A1 * | 10/2025 | Puttagunta | G06F 16/24522 |
| 2025/0370992 | A1 * | 12/2025 | Meteer | G06F 16/24522 |
| 2026/0003874 | A1 * | 1/2026 | Jootoo Ramesh Bapu | G06F 16/24569 |

OTHER PUBLICATIONS

Chen, Qian et al. "BERT for Joint Intent Classification and Slot Filling." ArXiv abs/1902.10909 (2019).

B. Kasthuriarachchy, M. Chetty, G. Karmakar and D. Walls, "Pre-trained Language Models with Limited Data for Intent Classification," 2020 International Joint Conference on Neural Networks (IJCNN), Glasgow, UK, 2020, pp. 1-9.

Sahu, Gaurav et al. "Data Augmentation for Intent Classification with Off-the-shelf Large Language Models." NLP4CONVAI (2022).

Parikh, Soham et al. "Exploring Zero and Few-shot Techniques for Intent Classification." Annual Meeting of the Association for Computational Linguistics (2023).

Lobo, Elita et al. "Matching table metadata with business glossaries using large language models." ArXiv abs/2309.11506 (2023).

* cited by examiner

Receive a natural language query from a user in a user interface of a generative artificial intelligence platform, the generative artificial intelligence platform being coupled to an enterprise data catalog and the natural language query comprising a plurality of query terms

101

Query an entity index based at least in part on one or more query terms in the plurality of query terms to identify one or more class entities corresponding to the natural language query

102

Identify one or more assets in the enterprise data catalog corresponding to the one or more class entities

103

Identify a metadata context corresponding to the one or more assets based at least in part on the entity index

104

Retrieve one or more previous conversations of the user on the generative artificial intelligence platform

105

Generate a structured prompt based at least in part on the natural language query, the one or more assets, the metadata context corresponding to the one or more assets, and the one or more previous conversations

106

Determine an intent associated with the natural language query by inputting the structured prompt into a fine-tuned large language model, the fine-tuned LLM being trained based at least in part on a plurality training queries on the enterprise data catalog, a plurality of training conversations, and a plurality of training metadata contexts

107

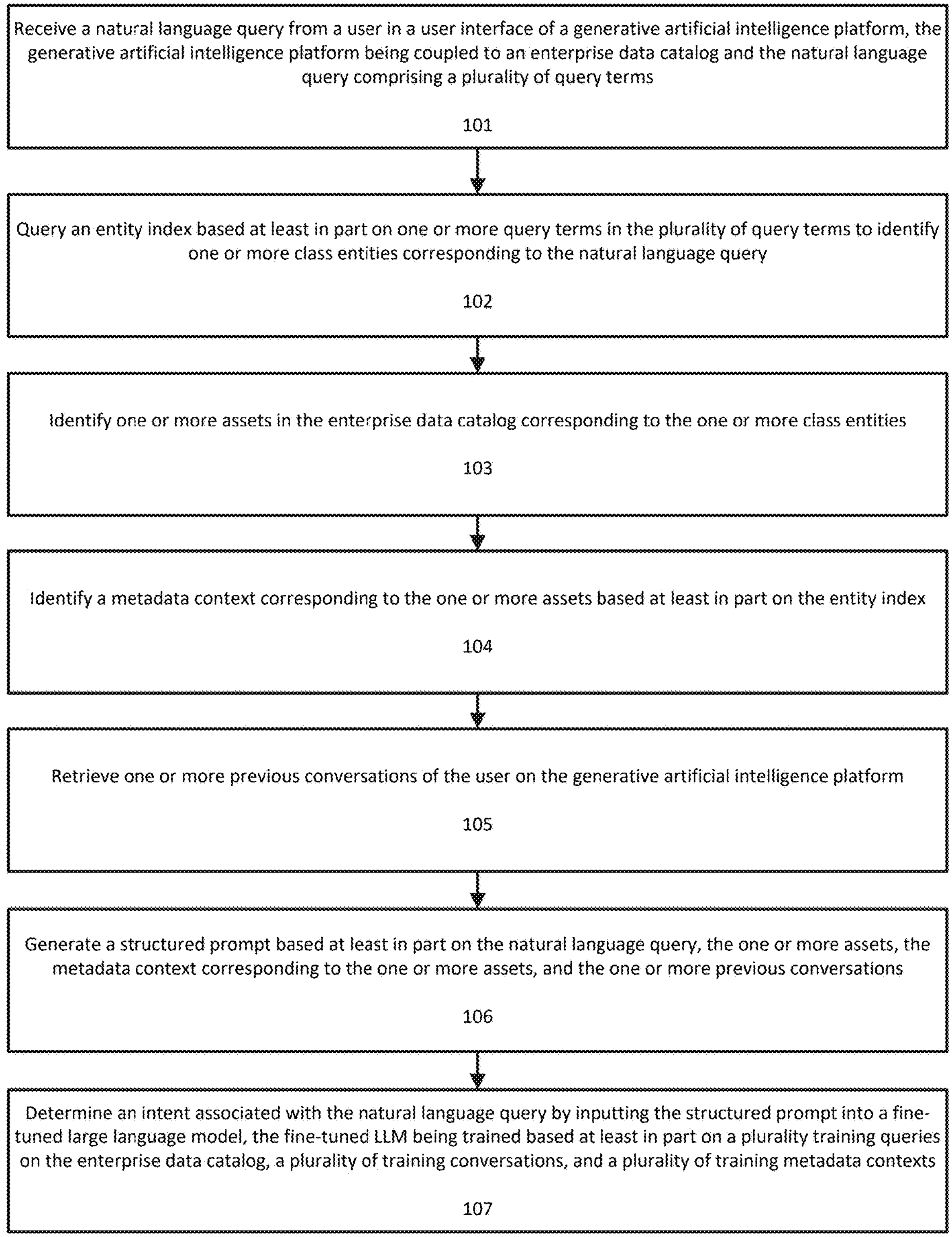

Fig. 1

Identify one or more related asset types for each asset in the one or more assets based at least in part on one or more of the entity index or a metadata index generated based at least in part on the enterprise data catalog

501

Identify one or more joinable assets for each asset in the one or more assets based at least in part on a primary key-foreign key relationship between the asset and the other assets in the enterprise data catalog

502

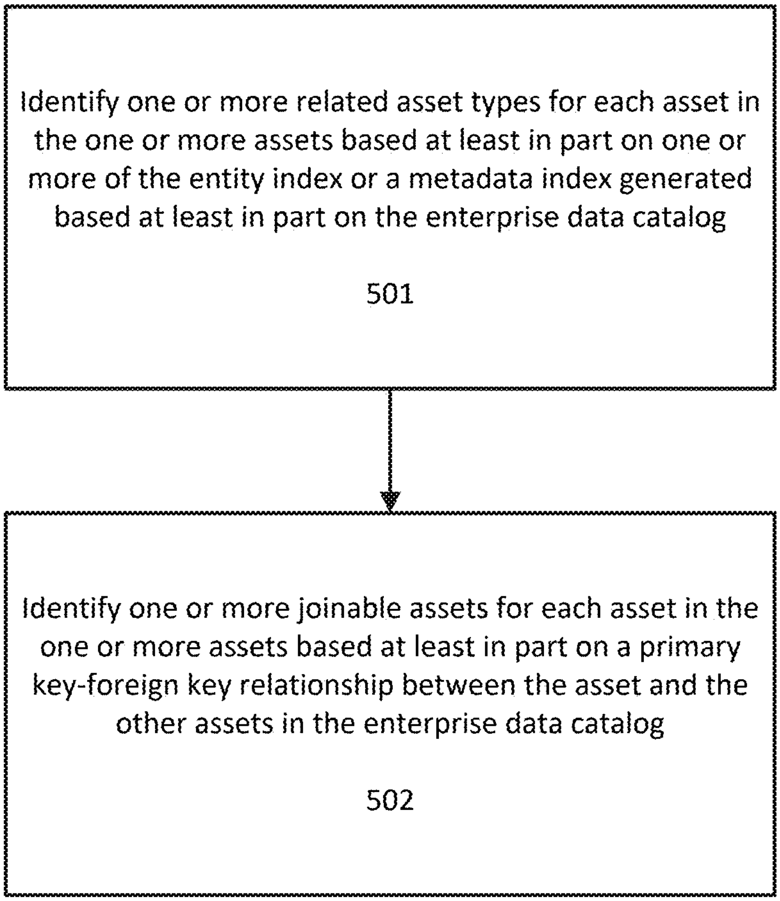

Fig. 5

Task
Given a conversation, summarise the recent user question into a standalone question based on previous questions and responses in that conversation if the user question is a follow-up. Along with that, classify the question into one of the following intents {...} If the question contains phrases like clear context, ignore context, clear previous messages, start fresh etc, return the question as it is. Also, give a response with a positive affirmation to acknowledge the query and summarize it into a standalone question based on previous questions and responses in that conversation if the user question is a follow-up. This can include words that fit naturally into conversation. The output must start with the positive affirmation followed by the JSON which gives the summarised query and the intent.

Chat History
{}

Metadata Context
{}

User Query
{}

Answer
Given the user question and the chat history, here is the positive affirmation followed by standalone question and the intent in JSON format: {}

Prompt 800

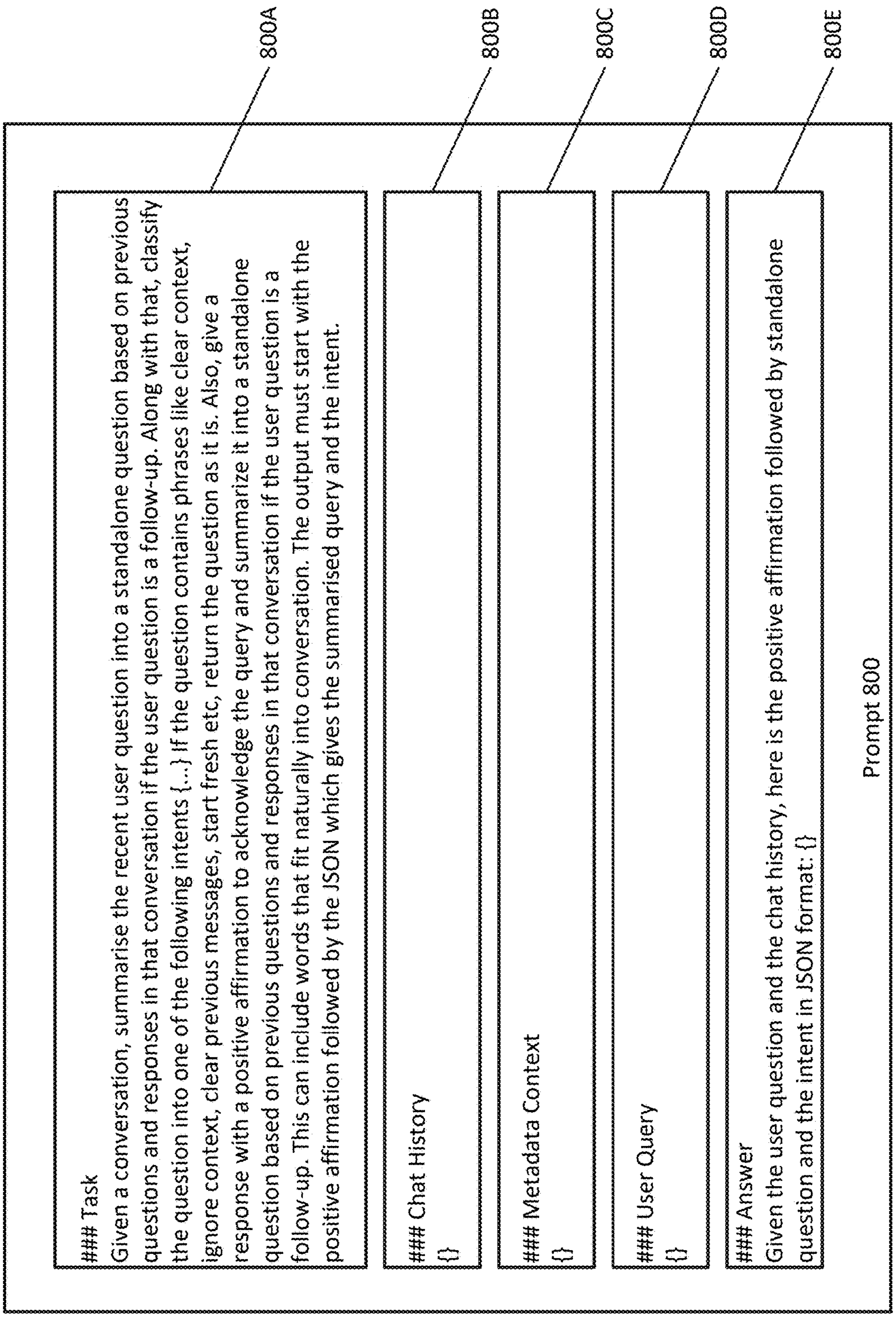

Fig. 8

Generate one or more backend queries based at least in part on the natural language query and the determined intent

1101A

Execute the one or more backend queries to identify one or more results
1101B

Generate the response to the natural language query based at least in part on the identified one or more results

1101C

Generate a response to the natural language query based at least in part on the determined intent

1101

Transmit the response in the user interface of the generative artificial intelligence platform

1102

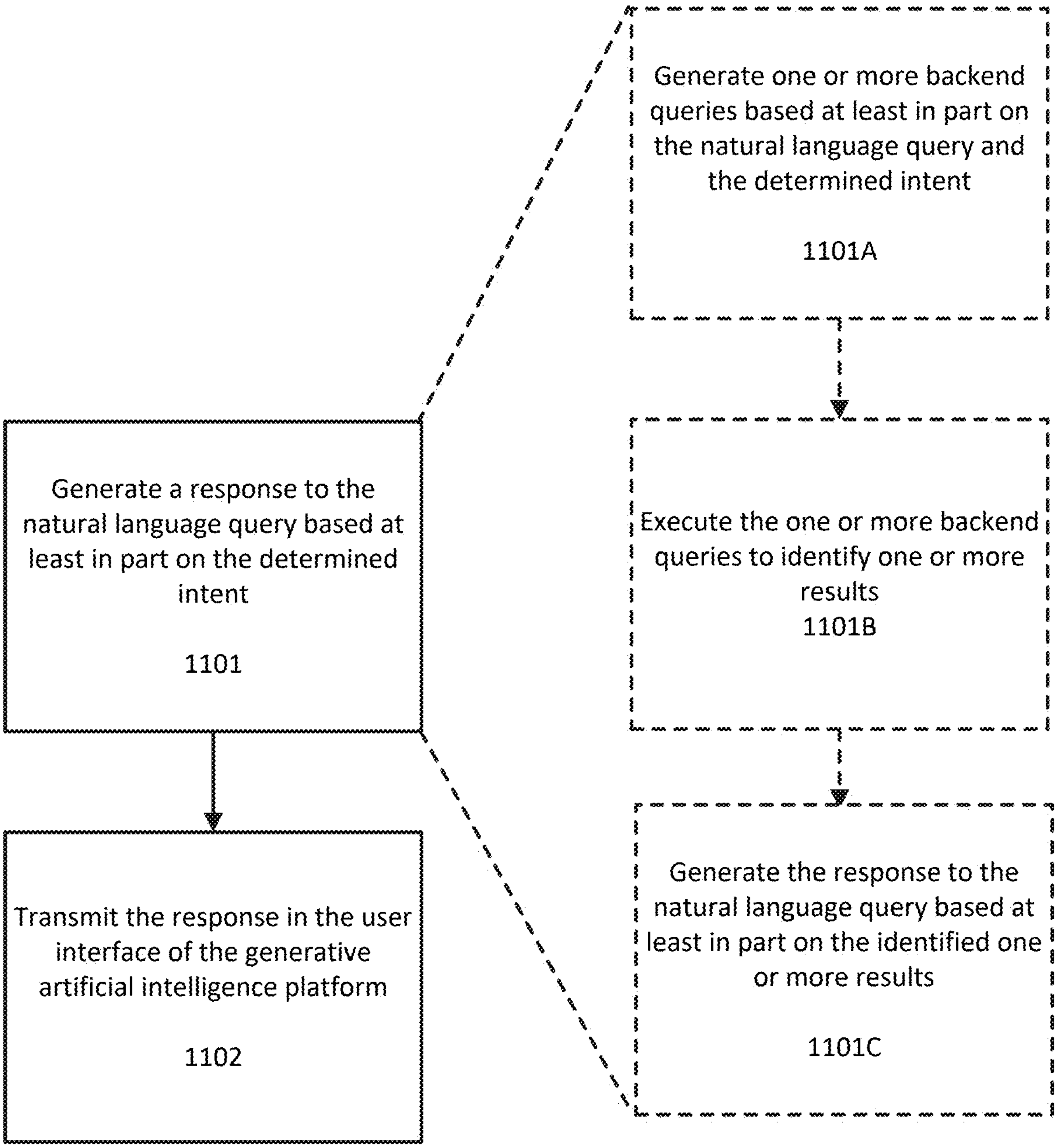

Fig. 11

METHOD, APPARATUS, AND COMPUTER-READABLE MEDIUM FOR INTENT CLASSIFICATION OF NATURAL LANGUAGE QUERIES IN A GENERATIVE ARTIFICIAL INTELLIGENCE PLATFORM

RELATED APPLICATION DATA

This application is a continuation-in-part of U.S. Non-provisional application Ser. No. 19/016,948, filed Jan. 10, 2025, the disclosure of which is hereby incorporated by reference in its entirety.

BACKGROUND

Natural language processing (NLP) systems utilize computational techniques to parse and understand natural language. NLP techniques allow computer systems to extract syntactic and semantic meaning from human language and have a variety of applications. Within NLP, intent classification is the process for identifying a purpose or context relating to a particular natural language query. Effective intent classification is critical for accurately and efficiently processing natural language queries, as the semantic meaning of a particular sequence of natural language strings can vary greatly depending on the intent of the user.

Effective intent classification is particularly crucial in enterprise data management systems and in other environments where users engage in complex, multi-step reasoning. Traditional systems often rely solely on immediate user inputs to determine intent, which can result in imprecise or contextually irrelevant responses. These systems fail to account for the evolving nature of dialogues or the underlying structure of the data systems with which a user is interfacing.

In enterprise settings, interactions frequently involve intricate queries that build on previous exchanges and require an understanding of the relationships between various data assets. For example, a user might first inquire about sales datasets and subsequently ask for the lineage of one of the discovered sales datasets. Without considering the conversational history, traditional systems struggle to maintain context and identify intent, leading to misunderstandings and inefficiencies in data analysis and response generation.

Additionally, the underlying structure of backend data systems, such as architecture, data types, relationships, and attributes-plays a vital role in interpreting user intents accurately. Ignoring this context can lead to misinterpretation of user queries, further complicating data management tasks.

Accordingly, improvements are needed in systems for intent classification of natural language queries.

BRIEF DESCRIPTION OF THE DRAWINGS

FIG. 1 illustrates a flowchart for intent classification of natural language queries in a generative artificial intelligence platform according to an exemplary embodiment.

FIG. 5 illustrates a flowchart for identifying a metadata context corresponding to the one or more assets according to an exemplary embodiment.

FIG. 8 illustrates an example of a structured prompt structure/template according to an exemplary embodiment.

FIG. 11 illustrates a flowchart for generating a response to the user query according to an exemplary embodiment.

DETAILED DESCRIPTION

Figure 2:
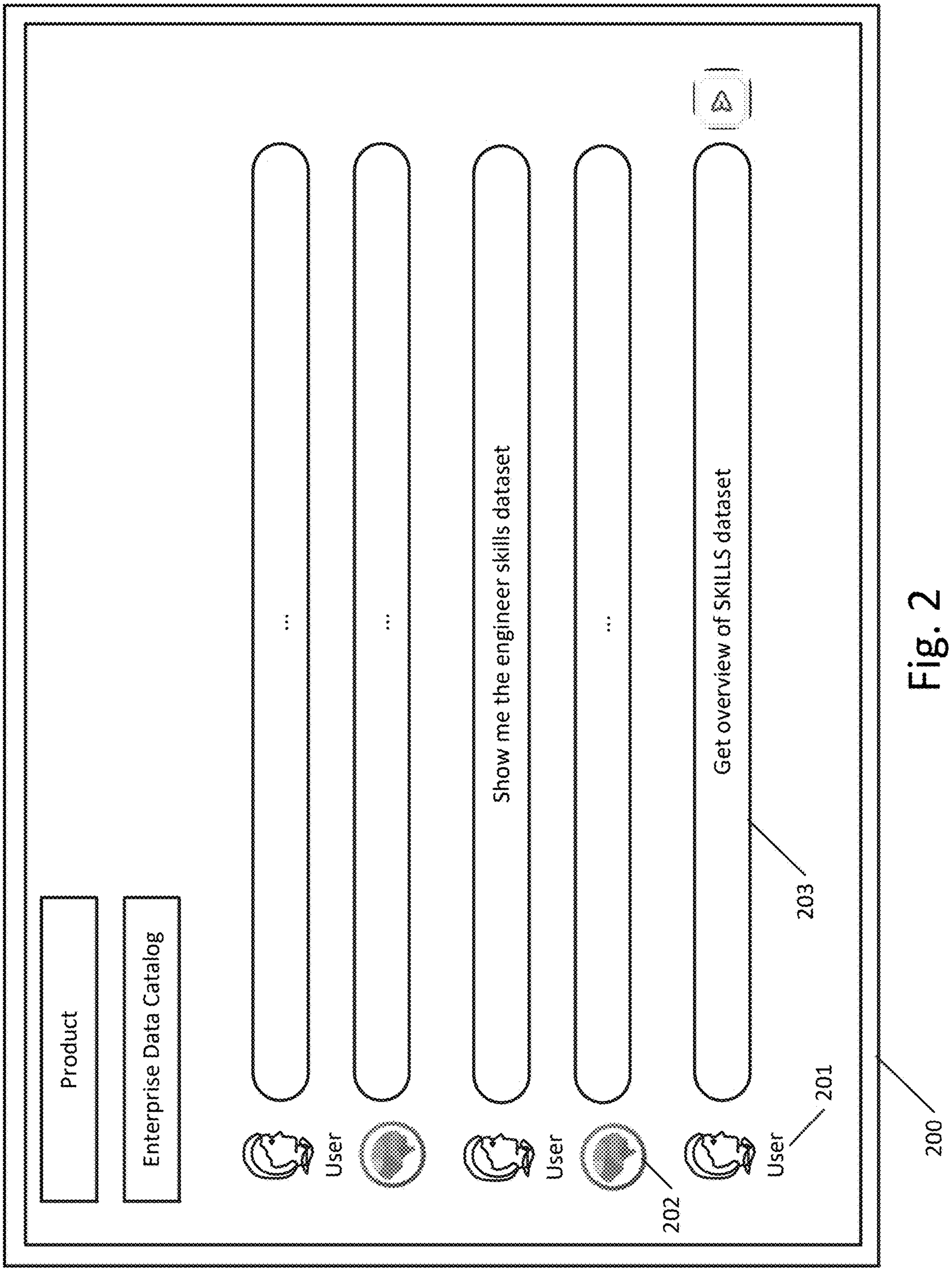
FIG. 2 illustrates an example of receiving a natural language query according to an exemplary embodiment.

While methods, systems, and computer-readable media are described herein by way of examples and embodiments, those skilled in the art recognize that methods, apparatuses, and computer-readable media for intent classification of natural language queries in a generative artificial intelligence platform are not limited to the embodiments or drawings described. The drawings and description are not intended to be limited to the particular form disclosed. Rather, the intention is to cover all modifications, equivalents and alternatives falling within the spirit and scope of the present disclosure and claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

Applicant has discovered a method, apparatus, and computer-readable medium (collectively "system") that uniquely combines conversational history and metadata context to achieve higher accuracy in intent prediction and classification. This dual-context approach leverages a large language model fine-tuned to accept user questions, chat history, and metadata context.

The present system improves generative artificial intelligence platforms coupled to enterprise data management systems by implementing an intent classification system that leverages historic conversation data, as well as the underlying structure of the relevant sections of the enterprise data catalog (referred to as the "metadata context") in order to accurate classify the intent of user queries.

Existing systems for intent classification have many drawbacks. Traditional intent classification systems rely solely on immediate user inputs, neglecting the evolving conversational history and rich metadata context. Unlike prior systems, the present system focuses on intent classification for classifying user intent within a conversational generative AI platform. As explained in greater detail below, the present system interprets user questions based on metadata context, based on relationships between the data assets being queried, as well as the conversation history pertaining to a particular question.

FIG. 1 illustrates a flowchart for intent classification of natural language queries in a generative artificial intelligence platform according to an exemplary embodiment. Each of the steps shown in FIG. 1 are performed by one or more computing devices of the system.

At step 101 a natural language query is received from a user in a user interface of a generative artificial intelligence platform, the generative artificial intelligence platform being coupled to an enterprise data catalog and the natural language query comprising a plurality of query terms. The natural language query can be any type of query that has an unstructured format and is not required to conform to any syntax or format rules.

FIG. 2 illustrates an example of receiving a natural language query according to an exemplary embodiment. User interface 200 can be a frontend interface of a generative artificial intelligence platform that is coupled to an enterprise data catalog and can be configured to receive natural language input from a user. For example, the user interface 200 can be an interface of a large language model (LLM) such as a generative pre-trained transformer (GPT). The LLM or GPT can be configured to interface with a backend enterprise data catalog, which itself can have a structured database format, such as a relational database, a graph database or other type of database.

As shown in FIG. 2, the interface 200 can correspond to product and/or an enterprise data catalog and allows for a back-and-forth dialog between the user 201 and the LLM/GPT 202. In the example shown in FIG. 2, the user 201 has entered the natural language query 203 "Get overview of SKILLS dataset."

Returning to FIG. 1, at step 102 an entity index is queried based at least in part on one or more query terms in the plurality of query terms to identify one or more entities corresponding to the natural language query.

The entity index is generated based at least in part on an entity graph corresponding to the enterprise data catalog. The entity graph, also referred to as a concept graph or knowledge graph, includes a plurality of nodes and a plurality of edges between the plurality of nodes. The plurality of nodes correspond to a plurality of concepts and the plurality of edges correspond to a plurality of relationships between the plurality of concepts.

Figure 3:
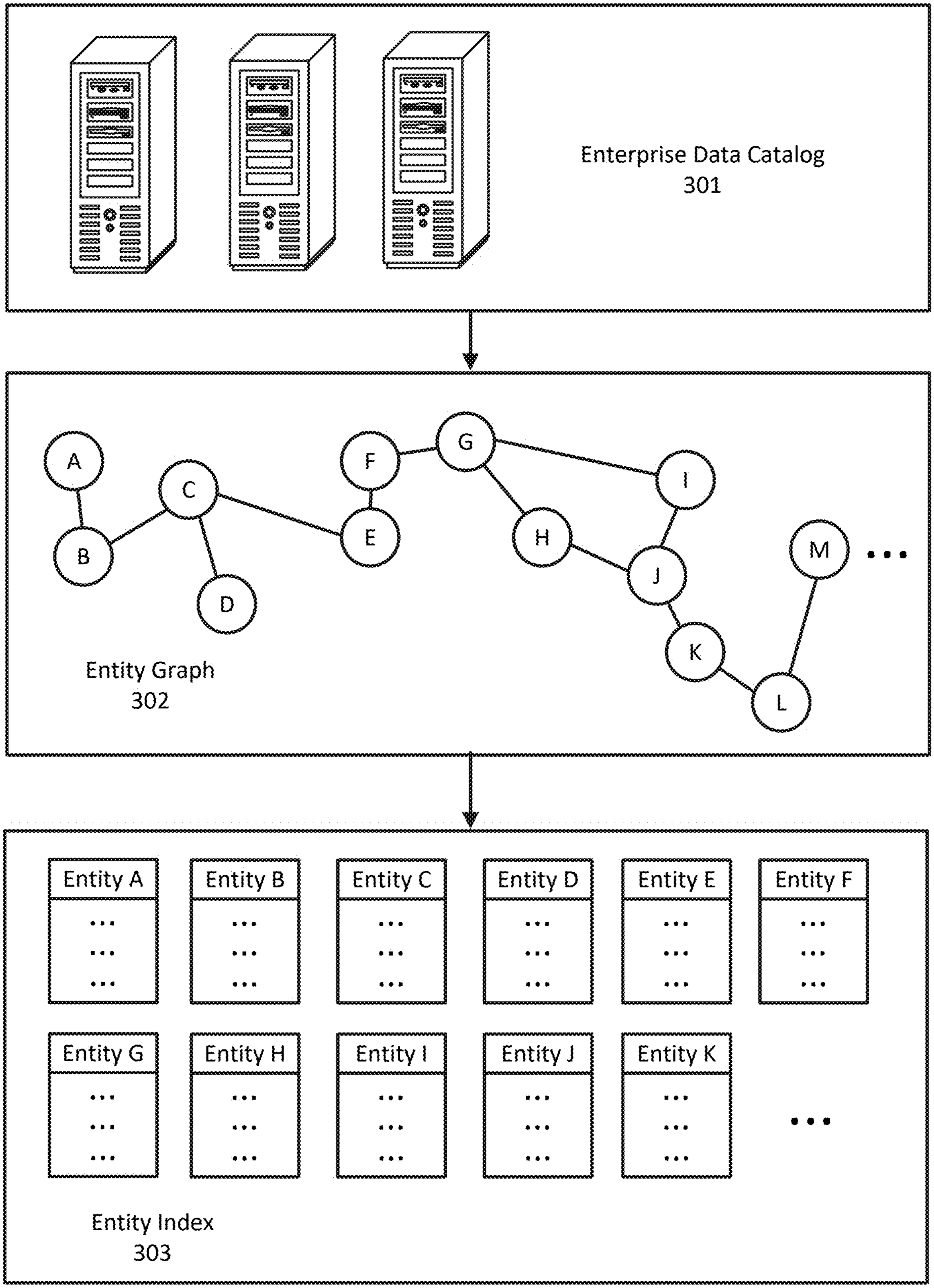
FIG. 3 illustrates the enterprise data catalog, entity graph, and entity index according to an exemplary embodiment.

FIG. 3 illustrates the enterprise data catalog, entity graph, and entity index according to an exemplary embodiment. The enterprise data catalog 301 is the backend database storing the enterprise data and can be organized in various ways, as discussed previously. For example, the enterprise data catalog can be a graph database or a relational database.

The entity graph 302 corresponds to the enterprise data catalog 301 and can be generated based at least in part on the enterprise data catalog. As discussed previously, each node in the entity graph corresponds to a concept, which can be any aspect of the enterprise data catalog. For example, each node can correspond to a data domain in the enterprise data catalog, a particular column in a table of the enterprise data catalog, a classification or attribute in the enterprise data catalog (e.g., business term), a particular data store, or any other conceptual entity in the enterprise data catalog. The entity graph can be pre-built from the enterprise data catalog prior to any query being received from a user.

The entity graph 302 also includes a plurality of edges between the plurality of nodes in the entity graph. The edges can be directed edges or undirected edges and indicate relationships between the concepts that correspond to the nodes. For example, an edge can connect a first node corresponding to a first table with a second node corresponding to another table, or to a third node corresponding to a column that is part of the first table, or to a fourth node corresponding to data domain that is part of the first table, or to any other node corresponding to any other conceptual entity that is related to the first table.

The entity index 303 is an index of the entities that are part of the entity graph and can store the entities that that are found in the entity graph, as well as attributes of those entities. For example, the entity graph 302 includes at least entities A-M and the entity index 303 stores data structures corresponding to each of these entities. The entity attributes can include the type of entity (e.g., class/domain, column, other concept), relationships (both the number of relationships and identification of related entities), and other features.

Figure 4:
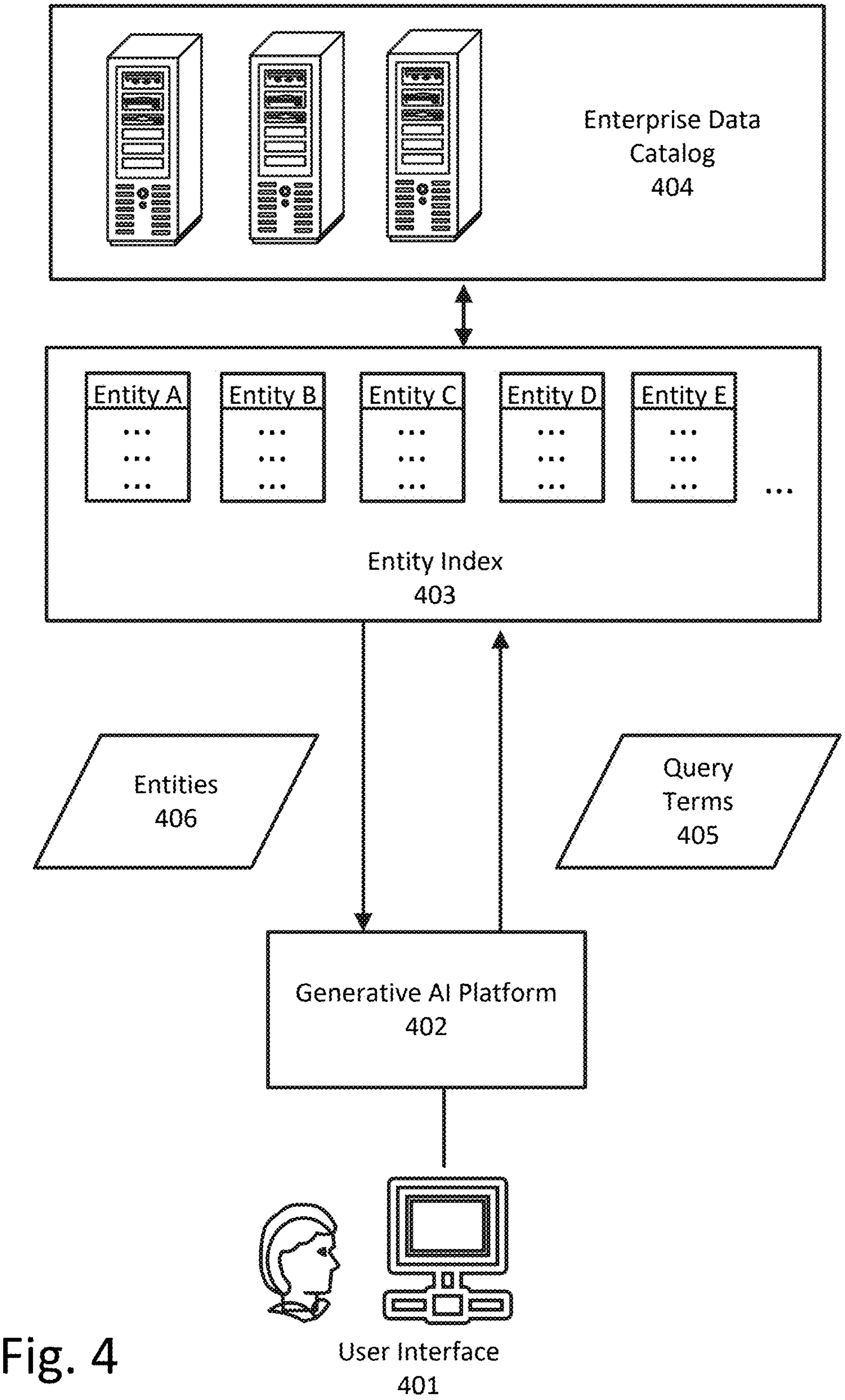
FIG. 4 illustrates an example of querying an entity index based at least in part on one or more query terms in the plurality of query terms to identify one or more entities corresponding to the natural language query according to an exemplary embodiment.

FIG. 4 illustrates an example of querying an entity index based at least in part on one or more query terms in the plurality of query terms to identify one or more entities corresponding to the natural language query according to an exemplary embodiment. As shown in FIG. 4, a user enters a query into the user interface 401 of the generative AI platform 402. The query terms 405 can then be used to query the entity index 403, which is coupled to the enterprise data catalog 404.

As shown in FIG. 4, the entity index 403 can return one or more named entities 406 in response to the query terms 405. The named entities can correspond to various types of entities in the entity index, including data domains, data tables, data types, relationships and/or other concepts extracted from the enterprise data catalog.

Returning to FIG. 1, at step 103 one or more assets in the enterprise data catalog corresponding to the one or more entities are identified. Assets can include, for example, tables, data domains, columns, or other data structures in the enterprise data catalog. Assets corresponding to the one or more entities can be identified in various ways. For example, the entities returned from the entity index can include entity information, such as entity type. The returned entities can be filtered to only include database assets, such as tables, columns, domains, etc. and to disregard other entities such as concepts, relationships, or non-asset concepts.

Alternatively or additionally, the system can store a list or other data structure of assets in the enterprise data catalog. When the entity index returns one or more entities corresponding to query terms, the returned entities can be used to lookup correspond assets in the asset data structure.

Additionally, the system can utilize a metadata index (discussed further below) to identify assets corresponding to the one or more entities. For example, the entities corresponding to the query terms can be looked up in the metadata index to identify which entities correspond to enterprise data catalog assets. The metadata index can include information about each entity that is stored in the entity index, include information about the type of entity (e.g., concept, table, domain, etc.). The metadata index can be used to identify which entities correspond to assets (e.g., database structures such as tables or columns) and filter out entities that are conceptual entities.

Returning to FIG. 1, at step 104 a metadata context corresponding to the one or more assets are identified. The metadata context can include a variety of metadata relating to the one or more identified assets. For example, the metadata context can include related assets and/or related asset types. The metadata context can also include joinable assets (i.e., joinable tables) that can be joined with the identified assets. In the context of databases, assets such as data tables are joinable if there is a primary key to foreign key relationship between a primary key at a first table and a foreign key at a second table. The present system utilizes detailed metadata relationships through detailed attribute and relationship analysis, including related asset types, and joinable tables to refine intent identification, such as distinguishing between data exploration and metadata exploration intents, as discussed further below.

FIG. 5 illustrates a flowchart for identifying a metadata context corresponding to the one or more assets according to an exemplary embodiment. At step 501 one or more related asset types are identified for each asset in the one or more assets based at least in part on one or more of the entity index or a metadata index generated based at least in part on the enterprise data catalog. The related asset types are those class types in the catalog that can have a relationship with the class type of the asset. For example, if the asset is a skills table, the related asset types can be processes, subdomain, systems, and/or policies.

At step 502 one or more joinable assets are identified for each asset in the one or more assets based at least in part on a primary key-foreign key relationship between the asset and the other assets in the enterprise data catalog. As discussed previously, the joinable assets can be joinable tables that have a joinable relationship (Primary Key-Foreign Key relationship) in the catalog with the assets.

Figure 6:
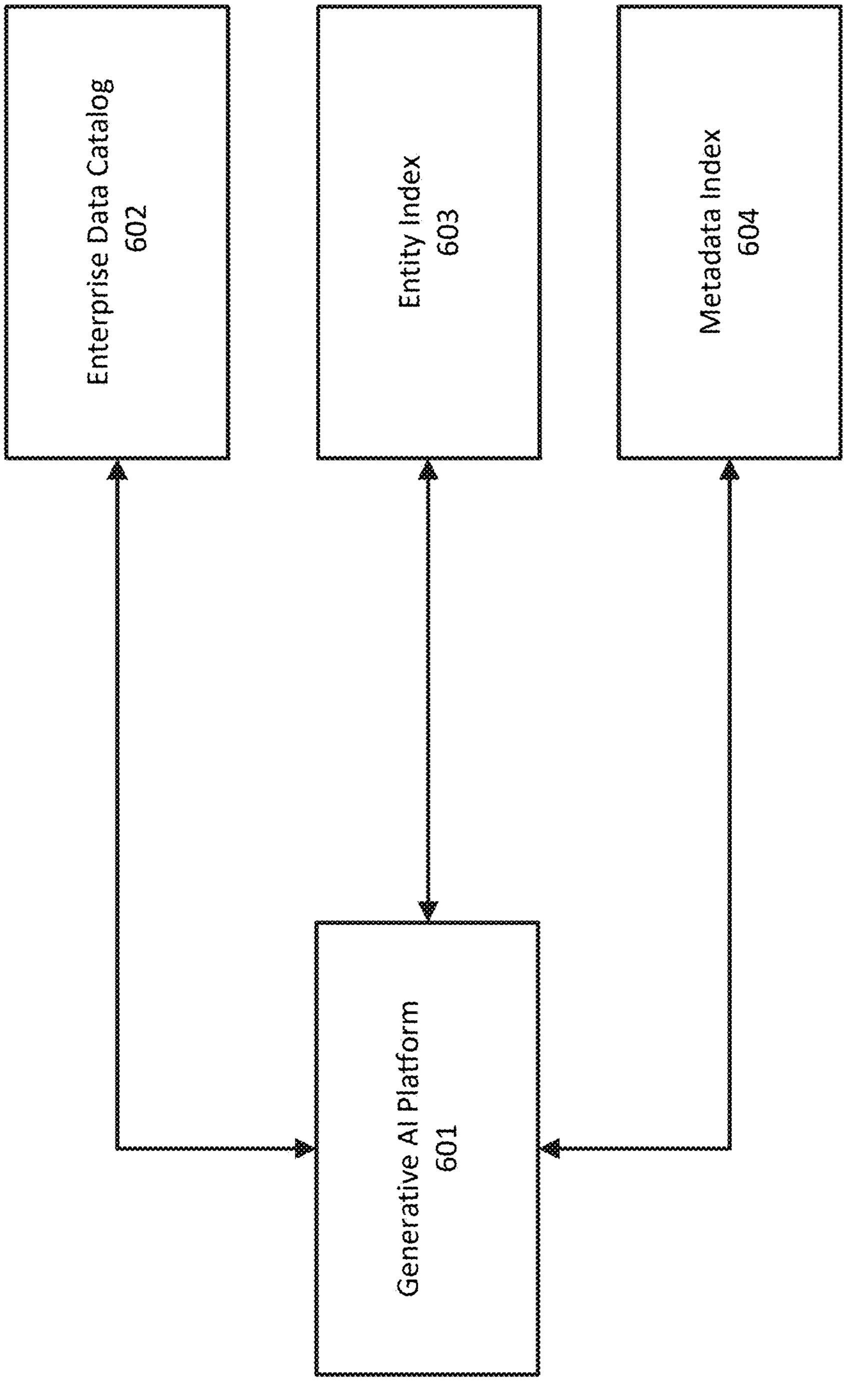
FIG. 6 illustrates a system chart illustrating components of the generative AI platform and backend components that are used to identify assets corresponding to query terms, related asset types, joinable assets, and/or other metadata according to an exemplary embodiment.

FIG. 6 illustrates a system chart illustrating components of the generative AI platform and backend components that are used to identify assets corresponding to query terms, related asset types, joinable assets, and/or other metadata according to an exemplary embodiment. As shown in FIG. 6, the generative AI platform 601 has bi-directional communication with the enterprise data catalog 602, the entity index 603, and the metadata index 604.

Returning to FIG. 1, at step 105 one or more previous conversations of the user on the generative artificial intelligence platform are retrieved. This step can include identifying previous conversation of the user and also identifying previous conversations that are specifically relevant to the query. Previous conversations can be stored in a backend database of the generative AI platform and can be stored and organized according to user and/or stored according to conversation topics.

The step of retrieving previous conversations can be performed in different ways. For example, natural language processing of the query can be used to identify one or more topics related to the query and the identified topics can be used to look up and retrieve previous conversations of that user relating to the identified topics. In another example, the user can specify which previous conversations or topics are pertinent to the query. In another example, the conversation history of the current conversation of the user can be retrieved, while disregarding other prior conversations. The frontend interface of the generative AI platform can include interface elements that allow the user to designate conversations so that a user can converse with the generative AI platform regarding different topics in parallel. In this case, the conversation history of the currently selected conversation can be retrieved. In yet another example, the retrieved conversation history can be retrieved based at least in part on a particular time interval. In this case, the conversation history of the user for a predetermined period of time in the past (e.g., 1 day, 5 days, 2 weeks, 1 month, etc.) can be retrieved.

At step 106 a structured prompt is generated based at least in part on the natural language query, the one or more assets, the metadata context corresponding to the one or more assets, and the one or more previous conversations. The structured prompt can incorporate user questions/queries and previous conversations, along with metadata context including related asset types and joinable assets. The structured prompt is provided as the prompt to a fine-tuned large language model (LLM) and allows for more accurate intent classification of the user query. As will be described further below, this structured prompt is the same prompt that is used during the training process and is configured to provide a more accurate assessment of user intent.

The structure prompt can include the natural language query, at least a portion of one or more previous conversations, one or more asset identifiers correspond to one or more assets, one or joinable asset identifiers corresponding to the one or more joinable assets for each asset in the one or more assets, and one or more related asset types for each asset in the one or more assets.

Figure 7:
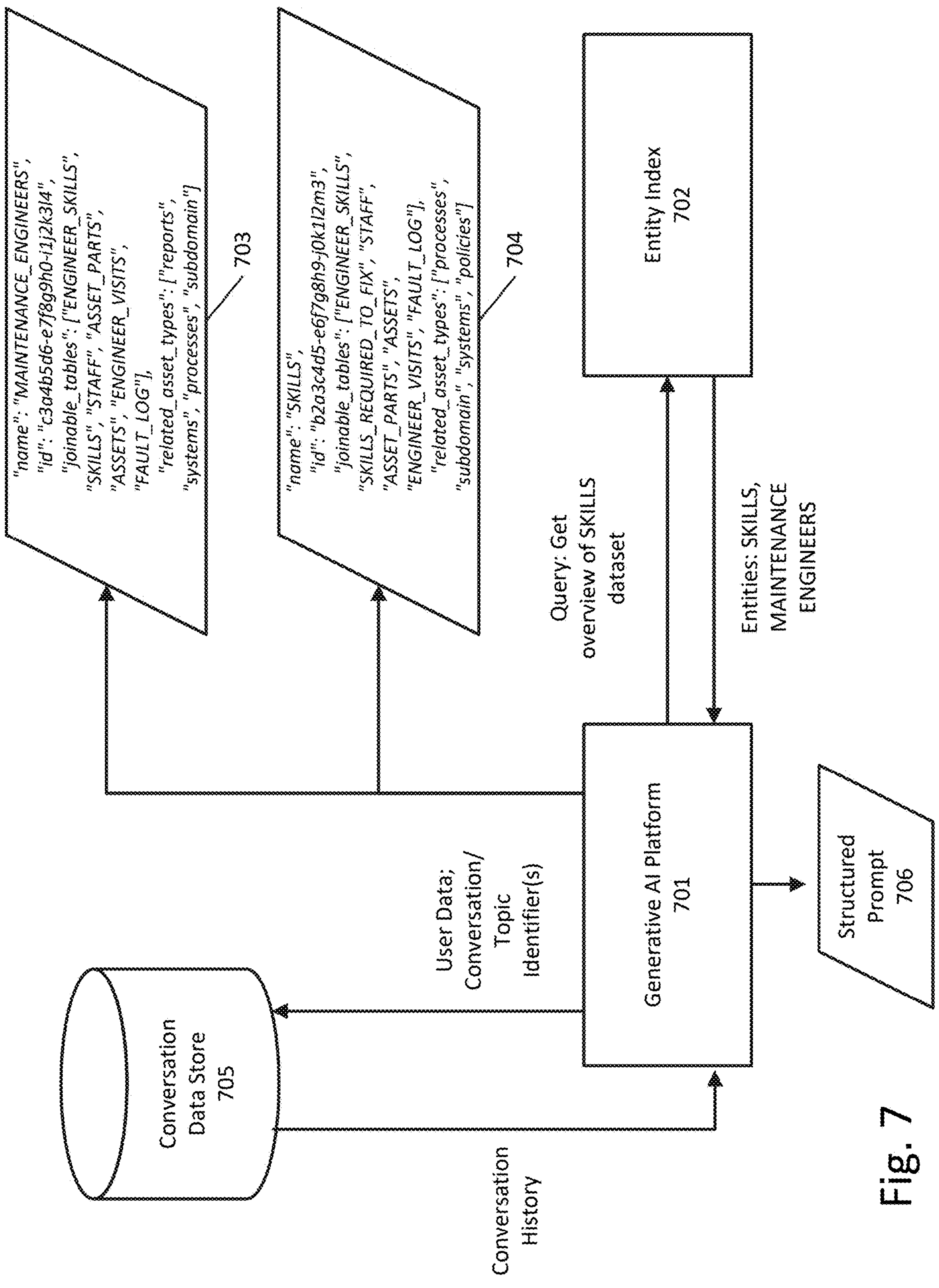
FIG. 7 illustrates a system diagram of the process of generating a structured prompt 706 according to an exemplary embodiment.

FIG. 7 illustrates a system diagram of the process of generating a structured prompt 706 according to an exemplary embodiment. The generative AI platform 701 receives a user query, in this case "Get overview of SKILLS dataset," and queries the entity index 702 with one or more query terms to identify entities corresponding to the query. In this case, the identified entities include the SKILLS entity and the MAINTENANCE ENGINEERS entity.

The generative AI platform can then determine assets in the enterprise data catalog corresponding the identified entities (SKILLS and MAINTENANCE ENGINEERS), as well as metadata context, such as related asset types, joinable assets, and other metadata corresponding to the determined assets. As discussed previously, these determinations can be performed based on the enterprise data catalog, the entity index, and/or a metadata index. For example, the identified entities can be used to lookup corresponding assets, such as tables or columns, in the enterprise catalog. The entity index can then be used to identify joinable assets and the entity graph, entity index, and/or metadata index can be used to identify related asset types. Box 703 illustrates the identified MAINTENANCE ENGINEERS asset (i.e., the maintenance engineers table), along with a unique identifier of the asset, a list of joinable assets (i.e., joinable tables having a primary key-foreign key relationship with the maintenance engineers table), and related asset types. Similarly, box 704 illustrates the identified SKILLS asset (i.e., the skills table), along with a unique identifier of the asset, a list of joinable assets (i.e., joinable tables having a primary key-foreign key relationship with the skills table), and related asset types.

Additionally, the generative AI platform 701 retrieves one or more conversation histories from a conversation data store 705 based on one or more of user data, a conversation identified, a topic identifier, or the one or more query terms in the user query.

The conversation history, the user query, and the identified assets and metadata context (e.g., as shown in box 703 and box 704) are then used to generate the structured prompt which is input to a fine-tune large language model to determine an intent classification.

FIG. 8 illustrates an example of a structured prompt structure/template according to an exemplary embodiment. The structured prompt 800 includes a task section 800A, chat history section 800B, a metadata context section 800C, a user query section 800D, and an answer 800E section.

As shown in FIG. 8, the prompt can include instructions to summarize the user query by integrating previous questions (if the query is a follow up) and can package the query along with metadata context and conversation history as part of the prompt. Additionally, the prompt can include instructions to provide the intent in a particular form-in this case the JavaScript Object Notation (JSON format).

Figure 9:
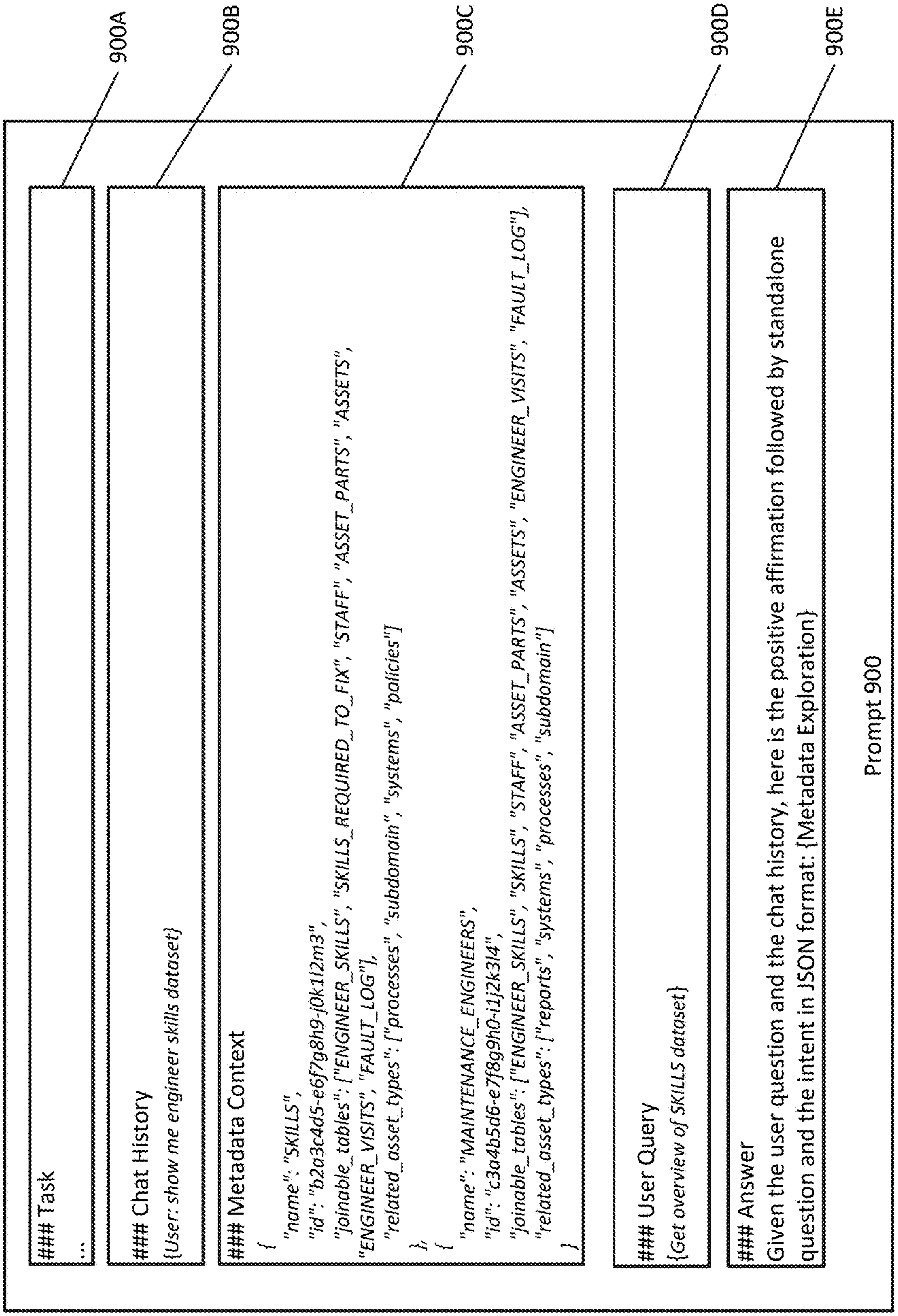
FIG. 9 illustrates an example of a structured prompt that is generated based on specific user query according to an exemplary embodiment.

FIG. 9 illustrates an example of a structured prompt that is generated based on specific user query according to an exemplary embodiment. The prompt 900 includes the user query 900D ("Get overview of SKILLS dataset"), as well as the user's previous chat history 900B, the determined metadata context 900C, and the answer format 900E. The prompt additionally includes the task description 900A, which is the same as the task shown in FIG. 8 and omitted for clarity.

Returning to FIG. 1, at step 107 an intent associated with the natural language query is determined by inputting the structured prompt into a fine-tuned large language model, the fine-tuned large language model being trained based at least in part on a plurality training queries on the enterprise data catalog, a plurality of training conversations, and a plurality of training metadata contexts.

The large language model (LLM) can first be pre-trained on an enterprise knowledge base corresponding to the enterprise, which grounds the LLM to a particular enterprises' data domain and reduces the hallucinations. After that, fine-tuning can be performed specifically for enterprise data management tasks, incorporating conversational history and metadata context that improves accuracy and efficiency. The metadata context used for training can be captured from the enterprise data catalog which helps the model to associate the intent based on the user question and the context which is passed. The large language model can be an instructions-based Mistral model or another type of model. The model is fine-tuned to accept user question, chat history and metadata context as input which is structured as a prompt to the model and the expected output is the classification of the question into one of the intents.

Figure 10:
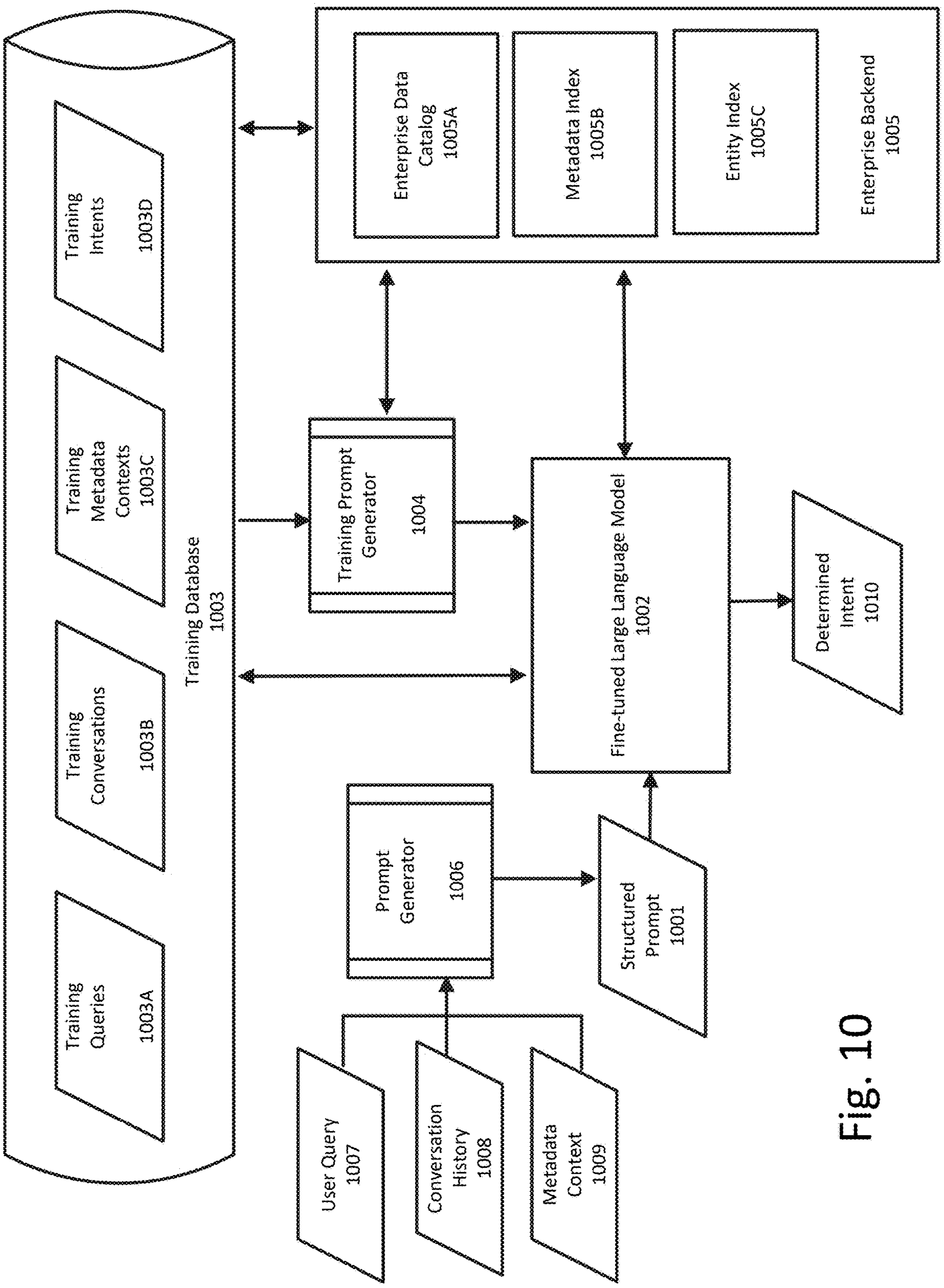
FIG. 10 illustrates a system chart showing the system for intent classification according to an exemplary embodiment.

FIG. 10 illustrates a system chart showing the system for intent classification according to an exemplary embodiment. The various components of the system are described in greater detail below.

A training database 1003 is used to train the fine-tuned large language model 1002. The training database includes training queries 1003, training conversations 1003B, training metadata contexts 1003C, and training intents 1003D. The training queries, training conversations, and training metadata context are provided to a training prompt generator 1004 which generates LLM training prompts for training the LLM 1002. The training database 1003 and the training prompt generator 1004 both have bidirectional communication with the enterprise backend 1005. The enterprise backend 1005 includes the enterprise data catalog 1005A, the metadata index 1005B, and the entity index 1005C. This bidirectional communication can be used to determine the training metadata contexts 1003C and training prompts. In sum, the training process takes in the following data:

Training Queries: The system receives training questions from the user or from a training data sets. The training questions are the primary input for intent classification.

Training Chat History+Training Metadata Context: The system also uses the conversational history and metadata context. This helps in understanding the background and additional context for the training questions.

Training Intent: The desired intent to which the user question is to be classified.

Training Prompt Generation: A component is responsible for generating training prompts. It considers the user question, chat history, metadata context, and the determined intent to create comprehensive prompts for training. The generated prompts can be used to train a Mistral model. When a Mistral model is used, the result of this training process is a fine-tuned Mistral model. This model is now optimized to classify intents accurately based on user questions and the provided context.

As discussed above, the training process uses training intents along with the determined intents from the LLM. The determined intent can then be compared with a corresponding training intent 1003D, which is also provided as input to the LLM in the training phase, and that corresponds to the provided training data and used to adjust and provide feedback to the LLM. In other words, the training data includes the desired intents and the LLM can be trained to produce the desired intent for a particular set of training data.

After the training phase, when the system is in active operation, the user query 1007, the conversation history 1008, and metadata context 1009 are provided to a prompt generator 1006 to produce a structured prompt 1001, as discussed previously. The user query serves as the primary input for the inference process. The conversation history and metadata context provide additional background information that helps the model in understanding the query more accurately. The prompt generator 1006 generates prompts for inference and takes into account the query, the conversation history, and metadata context.

The structured prompt 1001 is provided to the fine-tuned LLM 1002 (such as a fine-tuned Mistral model) and the fine-tuned LLM 1002 produces a determined intent 1010 for the query 1007. The determined intent is the systems understanding of the user's question in the context provided. The fine-tuned large language model can be configured to identify an intent from a plurality of potential intents. The plurality of potential intents can include data catalog discovery (a query for discovering data in the data catalog), metadata exploration (a query for metadata attributes and relationships of data in the data catalog), data exploration (a query asked on a customer database which is data related), data transformation (a query to create mappings or data integrations), product help (a query which is product help related), or others (any other queries which do not fall into the previous categories).

The examples in the table below illustrate the determined intents for a given query, conversation history, and metadata context:

| Query | Conversation History and Metadata Context | Determined Intent |
|---|---|---|
| Get overview of SKILLS dataset | User: show me engineer skills dataset<br>Metadata Context: [<br>{<br>"name": "SKILLS",<br>"id": "b2a3c4d5-e6f7g8h9-j0k1l2m3",<br>"joinable_tables": ["ENGINEER_SKILLS", "SKILLS_REQUIRED_TO_FIX", "STAFF", "ASSET_PARTS", "ASSETS", "ENGINEER_VISITS", "FAULT_LOG",<br>"related_asset_types": ["processes", "subdomain", "systems", "policies"]<br>},<br>{<br>"name": "MAINTENANCE_ENGINEERS",<br>"id": "c3a4b5d6-e7f8g9h0-i1j2k3l4",<br>"joinable_tables": ["ENGINEER_SKILLS", "SKILLS", "STAFF", "ASSET_PARTS", "ASSETS", "ENGINEER_VISITS", "FAULT_LOG"],<br>"related_asset_types": ["reports", "systems", "processes", "subdomain"]<br>}<br>] | Metadata Explore |
| Show me the faults reported by maintenance engineers | User: show me engineer skills dataset<br>Metadata Context: [<br>{<br>"name": "SKILLS",<br>"id": "b2a3c4d5-e6f7g8h9-j0k1l2m3",<br>"joinable_tables": ["ENGINEER_SKILLS", "SKILLS_REQUIRED_TO_FIX", "STAFF", "ASSET_PARTS", "ASSETS", "ENGINEER_VISITS", "FAULT_LOG"],<br>"related_asset_types": ["processes", "subdomain", "systems", "policies"]<br>},<br>{<br>"name": "MAINTENANCE_ENGINEERS",<br>"id": "c3a4b5d6-e7f8g9h0-i1j2k3l4",<br>"joinable_tables": ["ENGINEER_SKILLS", "SKILLS", "STAFF", "ASSET_PARTS", "ASSETS", "ENGINEER_VISITS", "FAULT_LOG"],<br>"related_asset_types": ["reports", "systems", "processes", "subdomain"]<br>}<br>] | Data Explore |
| create a pipeline to load this to CustBKP | User: Show me the fault logs recorded by Edmond in the last month using Fault_Log with id 'a1b2c3d4e5f6g7h8i9j0k1l2m3n4o5p6' and add a new column fault_history<br>Metadata Context:<br>SELECT fl.fault_log_entry_id, fl.fault_description, fl.fault_log_entry_datetime FROM Fault_Log AS fl JOIN Staff AS s ON fl.recorded_by_staff_id = s.staff_id WHERE s.staff_name = 'Edmond' AND fl.fault_log_entry_datetime >= DATEADD(month, −1, GETDATE( )) | Data Transform |
| How can I cancel a task that is currently in progress in the C360 platform? | | Product Help |
| What's the weather like today? | | Others |

As shown above, certain queries, such as "How can I cancel a task that is currently in progress in the C360 platform?" will result in a determined intent of "Product Help" regardless of conversation history and/or metadata context. Additionally, certain queries, such as "What's the weather like today?" will result in a determined intent of "Others" regardless of conversation history and/or metadata context.

Once the intent of the query is determined, the generative AI platform can produce a response to the query. FIG. 11 illustrates a flowchart for generating a response to the user query according to an exemplary embodiment.

At step 1101 a response to the natural language query is generated based at least in part on the determined intent. Generating a response to the natural language query can optionally include the steps shown in 1101A-1101C.

At step 1101A one or more backend queries are generated based at least in part on the natural language query and the determined intent. The backend queries can be queries configured to interface with the backend database of the enterprise data catalog and/or the metadata index or entity index. For example, if the backend database is a SQL database and the determined intent is a data explore intent, then the query can be used to generate one or more SQL queries (e.g., SELECT queries) to be sent to the backend database. In another example, if the determined intent is a metadata explore intent, then the backend queries can be configured to query the metadata index.

At step 1101B the one or more backend queries are executed to identify one or more results. The backend queries can be executed on the enterprise data catalog or on other backend structures, such as the metadata index, the entity index, or other data structures or databases storing data relating to the enterprise data catalog.

At step 1101C the response to the natural language query is generated based at least in part on the identified one or more results. This step can include transforming the one or more results into a natural language response. This step can be performed by text generation component of the generative AI platform, such as a Generative Pre-trained Transformer (GPT) that is configured to generate natural language text in response to inputs. For example, if the results are portions of the enterprise data catalog, then the response to the natural language query can transform those portions into an easily digestible or summarized format for the user within the frontend interface. The response can also transform numerical results or metadata into natural language text that responds to the user query.

At step 1102 the response in transmitted in the user interface of the generative artificial intelligence platform. The response can be transmitted as part of a frontend GPT interface and/or an be transmitted within current conversation of the user. The response can also be transmitted in other forms, such a linked document or file, or some combination of a textual response within the interface and a file. For example, the response can include text stating "Here is your requested data" and include a link to a spreadsheet file containing the data that was requested by the user.

Figure 12:
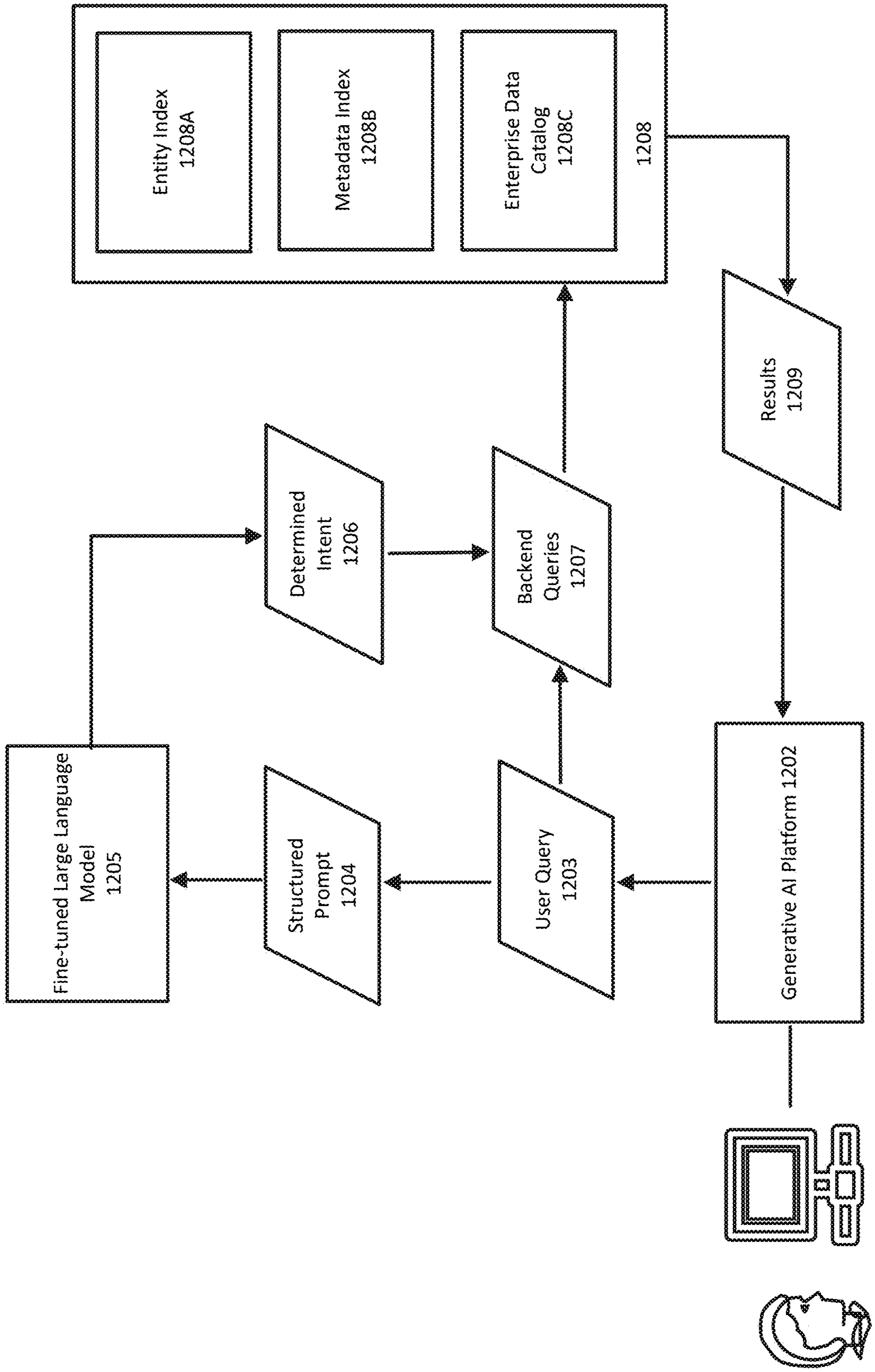
FIG. 12 illustrates a system chart for generating a response to the natural language query according to an exemplary embodiment.

FIG. 12 illustrates a system chart for generating a response to the natural language query according to an exemplary embodiment. As shown in FIG. 12, a user inputs a query into the user interface 1201 of a generative AI platform 1202. The user query 1203 is then used to generate structured prompt 1204, as discussed previously. The structured prompt 1204 is input into the fine-tuned LLM 1205 and the fine-tuned LLM determines an intent 1206 for the query. The determined intent 1206 and user query 1203 are then used to generate backend queries 1207. Backend queries are then executed one or more backend systems 1208, such as entity index 1208A, metadata index 1208B, and/or enterprise data catalog 1208C, to produce results 1209. The results 1209 are then provided back to the generative AI platform 1202, which transforms the results into one or more responses.

Figure 13:
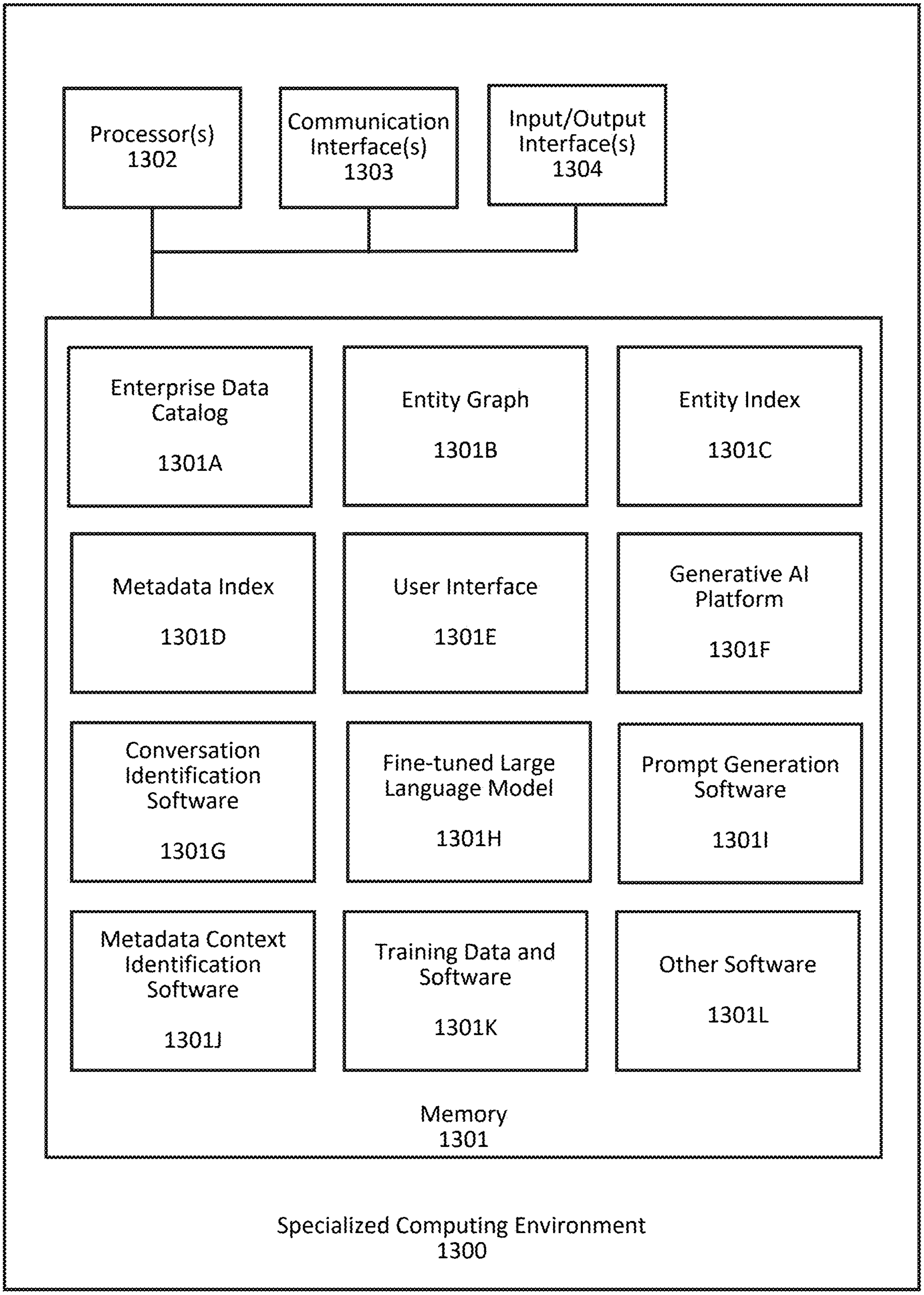
FIG. 13 illustrates a specialized computing environment for intent classification of natural language queries in a generative artificial intelligence platform according to an exemplary embodiment.

One or more of the above-described techniques can be implemented in or involve one or more special-purpose computer systems having computer-readable instructions loaded thereon that enable the computer system to implement the above-described techniques. FIG. 13 illustrates a specialized computing environment 1300 that is used to perform the above-described methods and implement the above-described systems according to an exemplary embodiment.

With reference to FIG. 13, the computing environment 1300 includes at least one processing unit/controller 1302 and memory 1301. The processing unit 1302 executes computer-executable instructions. In a multi-processing system, multiple processing units execute computer-executable instructions to increase processing power. The memory 1301 can be volatile memory (e.g., registers, cache, RAM), non-volatile memory (e.g., ROM, EEPROM, flash memory, etc.), or some combination of the two. The memory 1301 can store software implementing the above-described techniques and data structures, including enterprise data catalog 1301A, entity graph 1301B, entity index 1301C, metadata index 1301D, user interface 1301E, generative AI platform 1301F, conversation identification software 1301G, fine-tuned LLM 1301H, prompt generation software 1301I, metadata context identification software 1301J, training data and software 1301K, or other software 1301L corresponding to the processes described herein.

All of the software stored within memory 1301 can be stored as a computer-readable instructions, that when executed by one or more processors 1302, cause the processors to perform the functionality described with respect to FIGS. 1-12.

Processor(s) 1302 execute computer-executable instructions. In a multi-processing system, multiple processors or multicore processors can be used to execute computer-executable instructions to increase processing power and/or to execute certain software in parallel.

Specialized computing environment 1300 additionally includes a communication interface 1303, such as a network interface, which is used to communicate with devices, applications, or processes on a computer network or computing system, collect data from devices on a network, such as legacy systems, destination systems, or other network systems, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Specialized computing environment 1300 further includes input and output interfaces 1304 that allow users (such as system administrators) to provide input to the system to set parameters, to edit data stored in memory 1301, or to perform other administrative functions.

An interconnection mechanism (shown as a solid line in FIG. 13), such as a bus, controller, or network interconnects the components of the specialized computing environment 1300.

Input and output interfaces 1304 can be coupled to input and output devices. For example, Universal Serial Bus (USB) ports can allow for the connection of a keyboard, mouse, pen, trackball, touch screen, or game controller, a voice input device, a scanning device, a digital camera, remote control, or another device that provides input to the specialized computing environment 1300.

Specialized computing environment 1300 can additionally utilize a removable or non-removable storage, such as magnetic disks, magnetic tapes or cassettes, CD-ROMs, CD-RWs, DVDs, USB drives, or any other medium which can be used to store information and which can be accessed within the specialized computing environment 1300.

The present system utilizes several novel techniques and features to achieve a number of technical advantages. These techniques and advantages are described in greater detail below.

Analysis of Conversational History

Contextual Understanding: The system captures and analyzes the evolving dialogue context by maintaining a detailed record of historical user interactions. This allows the system to understand the flow and progression of the conversation, providing a richer context for intent classification.

Enhanced Intent Prediction: By considering past interactions, the system can predict user intents more accurately. For instance, if a user asks about "sales datasets" in one turn and then requests "the lineage of one of the discovered sales datasets," the system uses the historical context to interpret the follow-up query correctly.

Integration of Metadata Context

Leveraging Metadata Relationships: The system integrates metadata context by analyzing relationships and attributes associated with data assets. This includes data types, metadata attributes, joinable tables, and other relevant metadata that inform the intent classification process.

Refined Intent Determination: By leveraging detailed metadata relationships, the system refines intent determination, ensuring that responses are contextually relevant and accurate. For example, understanding that queries about joinable tables of a sales dataset are data exploration questions, while queries about metadata attributes of the sales dataset are metadata exploration questions, helps the system interpret user intents more precisely.

Dual-Context Approach

Combining Historical and Metadata Contexts: The system employs a dual-context approach that surpasses traditional methods relying solely on immediate user inputs. By combining conversational history and metadata context, the system achieves more precise intent classification.

Improved User Experience and Efficiency: This dual-context approach significantly improves user experience by providing accurate and contextually relevant responses. It also enhances operational efficiency in managing enterprise data by reducing misunderstandings and streamlining data interactions.

Advantages

Improved Accuracy Using Context and Chat History

By integrating both conversational history and metadata context, the system achieves a much higher level of precision in identifying user intent. Traditional systems, which rely only on immediate user inputs, often misinterpret queries due to a lack of contextual awareness. The large language model can accommodate a bigger context and thus can be leveraged to use that as part of the classification thereby improving accuracy.

Dynamic Intent Identification

The system's ability to analyze historical interactions enables it to adaptively identify user intent even as the conversation evolves. This contrasts with other systems that may lose context over time and fail to accurately interpret changing user intents.

Metadata-Driven Refinement

Leveraging detailed metadata relationships, such as data types and attributes, allows the system to refine intent identification. For example, queries about joinable tables can be accurately classified as data exploration questions, which is a capability typically missing in traditional systems where it considers only user question alone in determining the intent.

Enhanced User Experience

The system's sophisticated intent identification leads to more relevant and accurate responses, improving the overall user experience. Users are less likely to encounter misinterpreted queries and can interact with the system more efficiently, which is a clear advantage over less intuitive systems.

Operational Efficiency:

By accurately identifying user intents, the system reduces the need for repeated clarifications and follow-up questions. This streamlines operations and increases productivity, offering a significant improvement over traditional systems that often require additional user input to clarify intents.

Having described and illustrated the principles of our invention with reference to the described embodiment, it will be recognized that the described embodiment can be modified in arrangement and detail without departing from such principles. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

We claim:

1. A method executed by one or more computing devices for intent classification of natural language queries in a generative artificial intelligence platform, the method comprising:

receiving, by at least one of the one or more computing devices, a natural language query from a user in a user interface of a generative artificial intelligence platform, the generative artificial intelligence platform being coupled to an enterprise data catalog and the natural language query comprising a plurality of query terms;

querying, by at least one of the one or more computing devices, an entity index based at least in part on one or more query terms in the plurality of query terms to identify one or more entities corresponding to the natural language query;

identifying, by at least one of the one or more computing devices, one or more assets in the enterprise data catalog corresponding to the one or more entities;

identifying, by at least one of the one or more computing devices, a metadata context corresponding to the one or more assets;

retrieving, by at least one of the one or more computing devices, one or more previous conversations of the user on the generative artificial intelligence platform;

generating, by at least one of the one or more computing devices, a structured prompt based at least in part on the natural language query, the one or more assets, the metadata context corresponding to the one or more assets, and the one or more previous conversations; and determining, by at least one of the one or more computing devices, an intent associated with the natural language query by inputting the structured prompt into a fine-tuned large language model, the fine-tuned large language model being trained based at least in part on a plurality training queries on the enterprise data catalog, a plurality of training conversations, and a plurality of training metadata contexts.

2. The method of claim 1, further comprising:

generating, by at least one of the one or more computing devices, a response to the natural language query based at least in part on the determined intent; and transmitting, by at least one of the one or more computing devices, the response in the user interface of the generative artificial intelligence platform.

3. The method of claim 2, wherein generating a response to the natural language query based at least in part on the determined intent comprises:

generating one or more backend queries based at least in part on the natural language query and the determined intent;

executing the one or more backend queries to identify one or more results; and generating the response to the natural language query based at least in part on the identified one or more results.

4. The method of claim 1, wherein the entity index is generated based at least in part on an entity graph corresponding to the enterprise data catalog, the entity graph comprising a plurality of nodes and a plurality of edges between the plurality of nodes, wherein the plurality of nodes correspond to a plurality of concepts and the plurality of edges correspond to a plurality of relationships between the plurality of concepts.

5. The method of claim 1, wherein identifying metadata context corresponding to the one or more assets comprises:

identifying one or more related asset types for each asset in the one or more assets based at least in part on one or more of the entity index or a metadata index generated based at least in part on the enterprise data catalog; and identifying one or more joinable assets for each asset in the one or more assets based at least in part on a primary key-foreign key relationship between the asset and the other assets in the enterprise data catalog.

6. The method of claim 5, wherein the structured prompt comprises:

the natural language query;

at least a portion of the one or more previous conversations;

one or more asset identifiers correspond to the one or more assets;

one or joinable asset identifiers corresponding to the one or more joinable assets for each asset in the one or more assets; and the one or more related asset types for each asset in the one or more assets.

7. The method of claim 1, wherein the fine-tuned large language model is configured to identify an intent from a plurality of potential intents, the plurality of potential intents comprising data catalog discovery, metadata exploration, data exploration, data transformation, and product help.

8. An apparatus for intent classification of natural language queries in a generative artificial intelligence platform, the apparatus comprising:

one or more processors; and one or more memories operatively coupled to at least one of the one or more processors and having instructions stored thereon that, when executed by at least one of the one or more processors, cause at least one of the one or more processors to:

receive a natural language query from a user in a user interface of a generative artificial intelligence platform, the generative artificial intelligence platform being coupled to an enterprise data catalog and the natural language query comprising a plurality of query terms;

query an entity index based at least in part on one or more query terms in the plurality of query terms to identify one or more entities corresponding to the natural language query;

identify one or more assets in the enterprise data catalog corresponding to the one or more entities;

identify a metadata context corresponding to the one or more assets;

retrieve one or more previous conversations of the user on the generative artificial intelligence platform;

generate a structured prompt based at least in part on the natural language query, the one or more assets, the metadata context corresponding to the one or more assets, and the one or more previous conversations; and determine an intent associated with the natural language query by inputting the structured prompt into a fine-tuned large language model, the fine-tuned large language model being trained based at least in part on a plurality training queries on the enterprise data catalog, a plurality of training conversations, and a plurality of training metadata contexts.

9. The apparatus of claim 8, wherein at least one of the one or more memories has further instructions stored thereon that, when executed by at least one of the one or more processors, cause at least one of the one or more processors to:

generate a response to the natural language query based at least in part on the determined intent; and transmit the response in the user interface of the generative artificial intelligence platform.

10. The apparatus of claim 9, wherein the instructions that, when executed by at least one of the one or more processors, cause at least one of the one or more processors to generate a response to the natural language query based at least in part on the determined intent further cause at least one of the one or more processors to:

generate one or more backend queries based at least in part on the natural language query and the determined intent;

execute the one or more backend queries to identify one or more results; and generating the response to the natural language query based at least in part on the identified one or more results.

11. The apparatus of claim 8, wherein the entity index is generated based at least in part on an entity graph corresponding to the enterprise data catalog, the entity graph comprising a plurality of nodes and a plurality of edges between the plurality of nodes, wherein the plurality of nodes correspond to a plurality of concepts and the plurality of edges correspond to a plurality of relationships between the plurality of concepts.

12. The apparatus of claim 8, wherein the instructions that, when executed by at least one of the one or more processors, cause at least one of the one or more processors to identify metadata context corresponding to the one or more assets further cause at least one of the one or more processors to:

identify one or more related asset types for each asset in the one or more assets based at least in part on one or more of the entity index or a metadata index generated based at least in part on the enterprise data catalog; and identify one or more joinable assets for each asset in the one or more assets based at least in part on a primary key-foreign key relationship between the asset and the other assets in the enterprise data catalog.

13. The apparatus of claim 12, wherein the structured prompt comprises:

the natural language query;

at least a portion of the one or more previous conversations;

one or more asset identifiers correspond to the one or more assets;

one or joinable asset identifiers corresponding to the one or more joinable assets for each asset in the one or more assets; and the one or more related asset types for each asset in the one or more assets.

14. The apparatus of claim 8, wherein the fine-tuned large language model is configured to identify an intent from a plurality of potential intents, the plurality of potential intents comprising data catalog discovery, metadata exploration, data exploration, data transformation, and product help.

15. At least one non-transitory computer-readable medium storing computer-readable instructions for intent classification of natural language queries in a generative artificial intelligence platform that, when executed by one or more computing devices, cause at least one of the one or more computing devices to:

receive a natural language query from a user in a user interface of a generative artificial intelligence platform, the generative artificial intelligence platform being coupled to an enterprise data catalog and the natural language query comprising a plurality of query terms;

query an entity index based at least in part on one or more query terms in the plurality of query terms to identify one or more entities corresponding to the natural language query;

identify one or more assets in the enterprise data catalog corresponding to the one or more entities;

identify a metadata context corresponding to the one or more assets;

retrieve one or more previous conversations of the user on the generative artificial intelligence platform;

generate a structured prompt based at least in part on the natural language query, the one or more assets, the metadata context corresponding to the one or more assets, and the one or more previous conversations; and determine an intent associated with the natural language query by inputting the structured prompt into a fine-tuned large language model, the fine-tuned large language model being trained based at least in part on a plurality training queries on the enterprise data catalog, a plurality of training conversations, and a plurality of training metadata contexts.

16. The at least one non-transitory computer-readable medium of claim 15, wherein at least one of the one or more memories has further instructions stored thereon that, when executed by at least one of the one or more computing devices, cause at least one of the one or more computing devices to:

generate a response to the natural language query based at least in part on the determined intent; and transmit the response in the user interface of the generative artificial intelligence platform.

17. The at least one non-transitory computer-readable medium of claim 16, wherein the instructions that, when executed by at least one of the one or more computing devices, cause at least one of the one or more computing devices to generate a response to the natural language query based at least in part on the determined intent further cause at least one of the one or more computing devices to:

generate one or more backend queries based at least in part on the natural language query and the determined intent;

execute the one or more backend queries to identify one or more results; and generating the response to the natural language query based at least in part on the identified one or more results.

18. The at least one non-transitory computer-readable medium of claim 15, wherein the entity index is generated based at least in part on an entity graph corresponding to the enterprise data catalog, the entity graph comprising a plurality of nodes and a plurality of edges between the plurality of nodes, wherein the plurality of nodes correspond to a plurality of concepts and the plurality of edges correspond to a plurality of relationships between the plurality of concepts.

19. The at least one non-transitory computer-readable medium of claim 15, wherein the instructions that, when executed by at least one of the one or more computing devices, cause at least one of the one or more computing devices to identify metadata context corresponding to the one or more assets further cause at least one of the one or more computing devices to:

identify one or more related asset types for each asset in the one or more assets based at least in part on one or more of the entity index or a metadata index generated based at least in part on the enterprise data catalog; and identify one or more joinable assets for each asset in the one or more assets based at least in part on a primary key-foreign key relationship between the asset and the other assets in the enterprise data catalog.

20. The at least one non-transitory computer-readable medium of claim 19, wherein the structured prompt comprises:

the natural language query;

at least a portion of the one or more previous conversations;

one or more asset identifiers correspond to the one or more assets;

one or joinable asset identifiers corresponding to the one or more joinable assets for each asset in the one or more assets; and the one or more related asset types for each asset in the one or more assets.

21. The at least one non-transitory computer-readable medium of claim 15, wherein the fine-tuned large language model is configured to identify an intent from a plurality of potential intents, the plurality of potential intents comprising data catalog discovery, metadata exploration, data exploration, data transformation, and product help.

* * * * *